United States Patent
Kazama et al.

(10) Patent No.: US 8,253,950 B2
(45) Date of Patent: Aug. 28, 2012

(54) RECORDING MATERIAL MOVING DEVICE TO POSITION A RECORD MATERIAL WITHIN A MOVABLE RANGE OF A PREDETERMINED WIDTH AND IMAGE FORMING DEVICE

(75) Inventors: Toshiyuki Kazama, Ebina (JP); Ryoji Watanabe, Ebina (JP); Shouichi Maeda, Ebina (JP); Makoto Ochiai, Iwatsuki (JP); Tatsunori Izawa, Ebina (JP); Naoto Nishi, Ebina (JP); Yoshinobu Nakamura, Ebina (JP); Satoshi Kanou, Ebina (JP); Shun Yashima, Ebina (JP); Michio Tada, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 862 days.

(21) Appl. No.: 12/332,033

(22) Filed: Dec. 10, 2008

(65) Prior Publication Data
US 2009/0257074 A1    Oct. 15, 2009

(30) Foreign Application Priority Data
Apr. 11, 2008   (JP) ................................. 2008-103883

(51) Int. Cl.
*G06K 15/00* (2006.01)
*G06K 1/00* (2006.01)

(52) U.S. Cl. ........................................ 358/1.12; 358/1.5
(58) Field of Classification Search .................... None
See application file for complete search history.

(56) References Cited

U.S. PATENT DOCUMENTS

| | | | | |
|---|---|---|---|---|
| 4,755,855 A | * | 7/1988 | Watanabe | 399/86 |
| 4,949,284 A | * | 8/1990 | Watanabe | 358/1.9 |
| 6,577,382 B2 | * | 6/2003 | Kida et al. | 355/77 |
| 6,741,831 B2 | * | 5/2004 | Seto | 399/388 |
| 2008/0024808 A1 | | 1/2008 | Masuda | 358/1.12 |

FOREIGN PATENT DOCUMENTS

| | | |
|---|---|---|
| JP | 11-189355 | 7/1999 |
| JP | 2003-263090 | 9/2003 |
| JP | 2005-206338 | 8/2005 |
| JP | 2008-233441 | 1/2008 |
| JP | 2008-32913 | 2/2008 |

\* cited by examiner

*Primary Examiner* — Gabriel Garcia
(74) *Attorney, Agent, or Firm* — Morgan, Lewis & Bockius LLP (57) ABSTRACT

A recording material moving device comprises: a position adjuster that moves a recording material in a direction which is parallel to a recording surface of the recording material and orthogonal to a transporting direction, in an upstream side of a recording position along the transport direction of the recording material; a reference position specifying unit that specifies a reference position; a determination unit that determines whether a range of a predetermined width centered on the reference position exceeds a movable range of the recording material within which the recording material can be moved by the position adjuster; and a controller that causes, if the determination unit determines that the movable range is not exceeded, the position adjuster to sequentially move the recording material within the movable range of the predetermined width centered on the reference position each time a condition for moving the recording material is satisfied.

13 Claims, 8 Drawing Sheets

| TRAY | REFERENCE POSITION | ACCUMULATIVE COUNT |
|---|---|---|
| 2a | 5.5mm | 50 |
| 2b | 3.39mm | 150 |
| 2c | 7.45mm | 350 |

| MOVABLE RANGE UPPER LIMIT | 10.0mm |
|---|---|
| MOVABLE RANGE LOWER LIMIT | 2.0mm |
| OSCILLATION WIDTH | 4.0mm |
| NUMBER OF PAPER SHEET POSITIONS | 9 |
| COUNT THRESHOLD | 100 |

RECORDING MATERIAL MOVING DEVICE TO POSITION A RECORD MATERIAL WITHIN A MOVABLE RANGE OF A PREDETERMINED WIDTH AND IMAGE FORMING DEVICE

CROSS-REFERENCE TO RELATED APPLICATIONS

This application is based on and claims priority under 35 U.S.C. 119 from Japanese Patent Application No. 2008-103883, which was filed on Apr. 11, 2008.

BACKGROUND

1. Technical Field

The present invention relates to a recording material moving device and an image forming device.

2. Related Art

An image forming device, which employs an electrophotographic method to form an image on a surface of a recording material such as a sheet of paper by recording a toner image that is formed on an intermediate transfer member, is well known in the art. In such an image forming device, the recording material is transported by a transport unit to a recording position where recording of an image formed on an intermediate transfer member is carried out. In this method, however, there are some instances where the recording material shifts out of position when the recording material is being transported by the transport unit because of mechanical errors of the transport unit. In order to overcome this problem a technique has been developed for measuring the position of the recording material before recording of an image and for correcting such a position shift of the recording material.

SUMMARY

According to one aspect of the invention, there is provided a recording material moving device, including: a position adjuster that moves a recording material in a direction which is parallel to a recording surface of the recording material and perpendicular to a transporting direction, in an upstream side of a recording position along the transport direction of the recording material, the recording position being where an image is formed on the recording material; a reference position specifying unit that specifies a reference position which is taken as a reference when the transport unit moves the recording material; a determination unit that determines whether a range of a predetermined width centered on the reference position specified by the reference position specifying unit exceeds a movable range of the recording material within which the recording material can be moved by the position adjuster; and a controller that causes, if the determination unit determines that the movable range is not exceeded, the position adjuster to sequentially move the recording material within the movable range of the predetermined width centered on the reference position each time a condition for moving the recording material is satisfied, or causes, if the determination unit determines that the movable range is exceeded, the position adjuster to sequentially move the recording material within the range of the predetermined width, which is included in the movable range and includes the reference position, each time the condition for moving the recording material is satisfied.

DETAILED DESCRIPTION

Hereinafter, an embodiment of the invention will be described with reference to the drawings.

A. Structure

A-1. Whole Structure of the Image Forming Device

Figure 1:
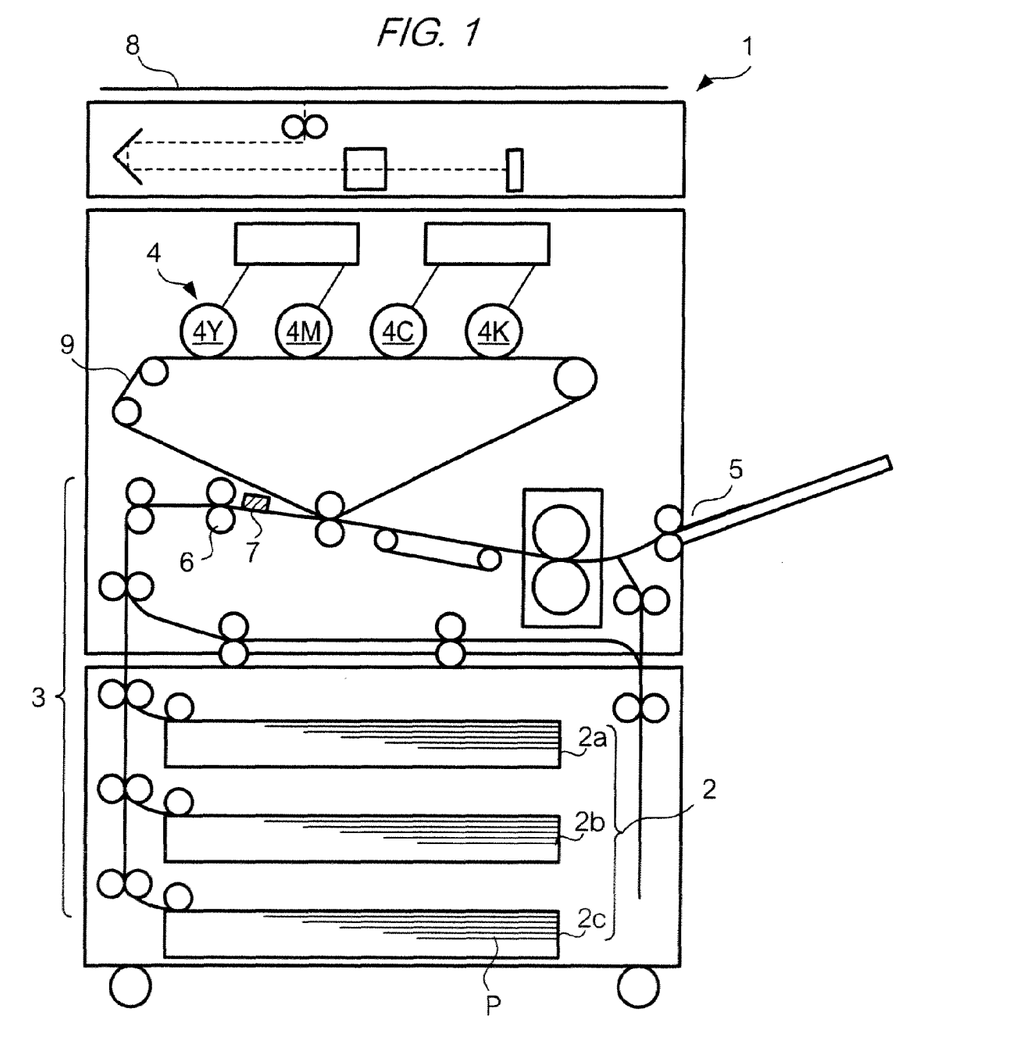
FIG. 1 is a view which illustrates an example of a schematic structure of an image forming device.

FIG. 1 is a view showing an example of a schematic structure of an image forming device 1. The image forming device 1 shown in the figure forms images and outputs the images onto recording materials. Examples of recording materials are conventional sheets of paper such as plain sheets of paper or recycled sheets of paper, and others such as OHP sheets made of resin etc. One embodiment of the present invention will now be described, referring to an example of such a recording material as a "paper sheet P".

The image forming device 1 includes trays 2a, 2b, and 2c (which will be hereinafter simply referred to as trays 2 where the trays need not be distinguished from each other), a transport unit 3, image forming units 4Y, 4M, 4C, and 4K (which will be simply referred to as image forming units 4 where the image forming units need not be distinguished from each other), an intermediate belt 9, and a sheet output unit 5. The trays 2a, 2b, and 2c are plural storage units for containing paper sheets P. The transport unit 3, for example, transports paper sheets P each of which is picked out of any of the trays 2. The image forming units 4Y, 4M, 4C, and 4K which, for example, form plural toner images on image carriers such as a photosensitive member, for color components Y, M, C, and K, respectively. The toner images formed by the image forming units 4 are layered and transferred onto the intermediate belt 9 as an example of a transfer unit. At a recording position, the intermediate belt 9 further transfers and records the transferred toner images to a paper sheet P which is transported by the transport unit 3. The sheet output unit 5 outputs the paper sheet P to which the images have been transferred and recorded.

In an upstream side of the recording position for carrying out recording of toner images along the transporting direction of the paper sheet P, there are provided registration rolls 6 and a CIS (Contact Image Sensor) sensor 7. The registration rolls 6 transport the paper sheet P to the recording position. The CIS sensor 7 is an example of a measurement unit which measures a position of the sheet paper P in the direction which is parallel to the surface of the paper sheet P and perpendicular to the transporting direction of the paper sheet P. The registration rolls 6 are configured as an example of a transport unit which transports the paper sheet P in the direction which is parallel to the surface of the paper sheet P and perpendicular to the transporting direction. The term "perpendicular" is intended to include an angle which is mathematically a perfect "right angle", and angles which can be regarded as substantially a right angle within a tolerable range of mechanical accuracy.

The image forming device 1 has an image reading unit 8 and a user interface unit not shown. The image reading unit 8 obtains image data from an original document by optical reading Based on the image data, the image units 4 perform image forming.

The embodiment employs the trays 2a, 2b, and 2c, which are internal trays, as examples of plural storage units for containing paper sheets P. The storage units are not limited to such internal trays but may be optional trays which are attached externally or manual feed trays.

A-2. Functional Structure of Image Forming Device

Figure 2:
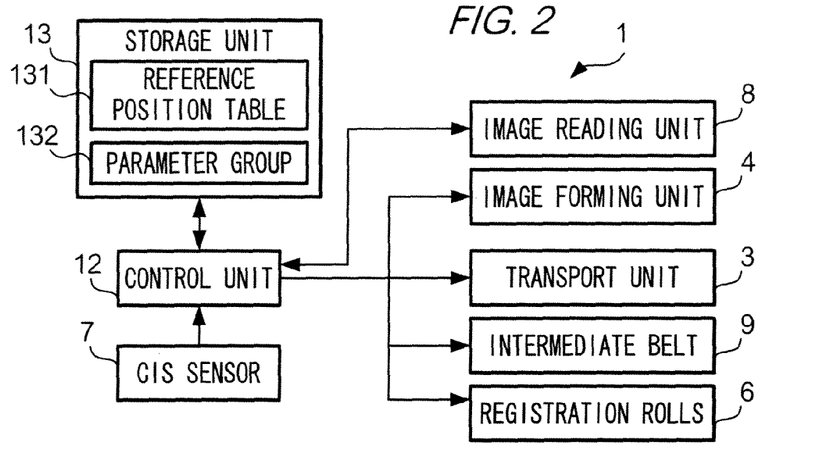
FIG. 2 is a diagram which illustrates an example of a functional structure of the image forming device.

FIG. 2 is a diagram showing an example of a functional structure of the image forming device 1. As shown in this figure, the image forming device 1 includes the CIS sensor 7, a control unit 12, a storage unit 13, the registration rolls 6, the image reading unit 8, the transport unit 3, and the image forming units 4.

The transport unit 3 picks up a paper sheet P from any of the trays 2, and transports the paper sheet P to a recording position where toner images are recorded onto the intermediate belt 9.

The CIS sensor 7 obtains position information by measuring a position in the direction which is parallel to and perpendicular to the surface of the paper sheet P transported by the transport unit 3. The CIS sensor 7 supplies the position information to the control unit 12.

Figure 3A:
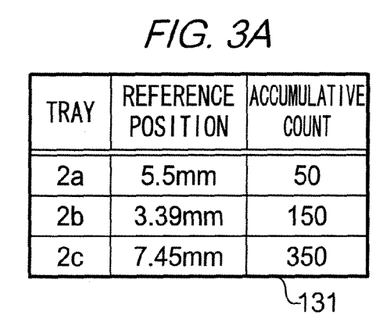
FIGS. 3A and 3B are tables showing examples of a reference position table and a parameter group in a storage unit.

The storage unit 13 is a storage device such as a hard disk drive or a flash memory. This storage unit 13, for example, stores reference positions which are determined for the respective trays 2 which contain paper sheets P. The reference positions are in a direction which is parallel to the surfaces of each paper sheet P and is perpendicular to the transporting direction of each paper sheet P. The reference positions are where paper sheets P are most likely transported by the transport unit 3. The reference positions are stored in a reference position table 131 as shown in FIG. 3A, associated with the respective trays 2. The reference position table 131 describes "accumulative counts" which indicate how many times paper sheets have been transported from the respective trays 2. The accumulative counts for all the trays 2 are set to 0 at the time of manufacture of the image forming device 1. The accumulative counts for all the trays 2 are reset when any of the image forming units 4 or the intermediate belt 9 is replaced with a new one. Also, when any of the trays 2 is replaced or a new tray 2 is added, the accumulative count for the replaced or added tray 2 is reset.

Figure 3B:
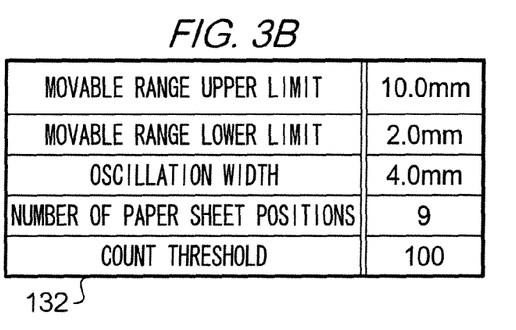

The storage unit 13 pre-stores a parameter group 132 including plural parameters and computer programs, which are required for processings to be carried out by the control unit 12. FIG. 3B shows an example of the parameter group 132. The parameter group 132 includes upper and lower limits of a movable range, an oscillation width, a number of paper sheet positions, and a rotation count threshold. The movable range is a range within which a paper sheet P can be moved in a direction which is parallel to the surface of the paper sheet P and perpendicular to the transporting direction. The oscillation width is a width by which a paper sheet P is cyclically moved in the direction which is parallel to the surface of the paper sheet P and perpendicular to the transport unit 3, so as to protect the transfer device and the fixing device. The number of paper sheet positions is a number of paper sheet positions within the oscillation width. The rotation count threshold is a number of times paper sheets P are transported until the paper sheet positions to which paper sheets P are to be moved are updated.

The control unit 12 includes a CPU (Central Processing Unit), a ROM (Read Only Memory), a RAM (Random Access Memory), etc. The control unit 12 controls respective units of the image forming device 1 by executing a computer program stored in the storage unit 13. From the reference position table 131, the control unit 12 reads a reference position for a tray 2 from which a paper sheet P has been picked up. The control unit 12 simultaneously reads the parameter group 132 from the storage unit 13. Based on the reference position and the parameter group, the control unit 12 calculates a position of a side end of the paper sheet P (hereinafter, a paper sheet position) when transporting the paper sheet P to the recording position. Further, a correction amount corresponding to a difference between the paper sheet position and a position measured by the CIS sensor 7 is obtained so that the position of the paper sheet P comes close to the paper sheet position, in the upstream side of the recording position of the intermediate belt 9 along the transporting direction of the paper sheet P. Further, the control unit 12 instructs the registration rolls 6 to perform a correction processing for correcting the obtained correction amount.

The registration rolls 6 are constituted of a pair of rolls. With a paper sheet P held between the pair of rolls in an upstream side of the recording position of the intermediate belt 9 along the transporting direction of the paper sheet P, the registration rolls 6 move the paper sheet P in a direction which is parallel to the surface of the paper sheet P and perpendicular to the paper sheet transporting direction. Axles of the pair of rolls are connected to a drive mechanism constituted of a motor and various gears. Depending on a rotation amount of the motor, a move amount of the registration rolls 6 is determined, i.e., a move amount of the paper sheet P is determined.

The image forming units 4 each align a head position of a latent image for forming a toner image, with a position corresponding to the paper sheet position calculated by the processing as described above.

A-3. Structure of CIS Sensor and Registration Rolls

Figure 4A:
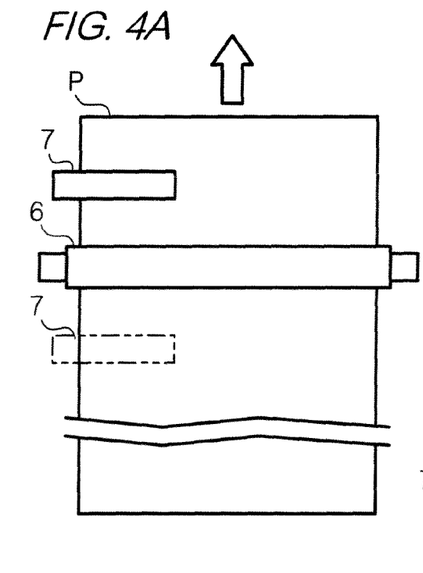
FIGS. 4A and 4B are views showing examples of structures near a CIS sensor and registration rolls.
Figure 4B:
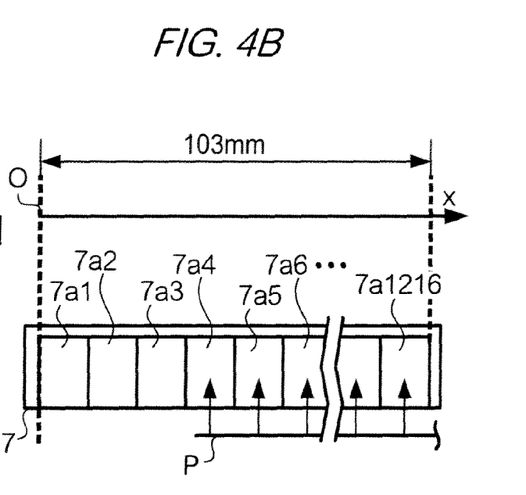

FIGS. 4 are views which illustrate a structure in the vicinity of the CIS sensor 7 and the registration rolls 6. FIG. 4A is a view in which the CIS sensor 7 and the registration rolls 6 are observed from upside in FIG. 1, i.e., from a surface where toner images are recorded on a paper sheet P (hereinafter referred to as an image forming surface) with the paper sheet transporting direction oriented upward. FIG. 4B is a view in which the CIS sensor 7 is observed from an upstream side of the paper sheet transporting direction.

As shown in FIG. 4A, the CIS sensor 7 and the registration rolls 6 are all provided in an upstream side of a recording position of toner images along the paper sheet transporting direction. The recording position is where toner images are recorded on a paper sheet P. The CIS sensor 7 is positioned in the left end side of each paper sheet P when the CIS sensor 7 is viewed with an image forming surface of the paper sheet P faced upward. The CIS sensor 7 is provided, deviated to one side of the convey path of the paper sheet P, in order to detect a side end position of the paper sheet P. Further, the CIS sensor 7 has a detection width of a predetermined size in a direction which is parallel to paper sheet surface and perpendicular to the paper sheet transporting direction, in order that one single CIS sensor 7 can respond to both, large and small sizes of paper sheets.

Such a CIS sensor 7 is, for example, constituted of 1,216 photo detectors 7a1 to 7a1216 (which will be simply referred to as photo detectors 7a where the photo detectors need not be distinguished from each other) which are arranged in a direction which is parallel to the paper sheet surface and perpendicular to the paper sheet transporting direction. Light is emitted from a light source, such as plural LEDs, and is reflected by an object to be detected, such as a paper sheet. Then, the reflected light is received by the photo detectors 7a. In case of the CIS sensor 7, a resolution with which a measurement is carried out is specified by the number of photo detectors 7a. In this embodiment, the CIS sensor 7 has a maximum measurement width of 103 mm from an origin point O as shown in FIG. 4B in a direction which intersects the paper sheet transporting direction. Within the maximum measurement width, the CIS sensor 7 has a resolution of 300 dpi.

The position at which the registration rolls 6 hold a paper sheet P to move the paper sheet P is in the top end side (e.g., the downstream side) of the paper sheet P along the paper sheet transporting direction, as shown in FIG. 4. On the other hand, the registration rolls 6 hold a paper sheet P in the read end side (e.g., the upstream side) of the paper sheet P along the transporting direction of the paper sheet P. However, there is a case that a paper sheet retainer (such as a retard roll for preventing feed of overlapped paper sheets) which cannot be mechanically released exists in the transport unit 3. Therefore, the registration rolls 6 need to move a paper sheet P, with the rear end of the paper sheet P retained by the paper sheet retainer. At this stage, if a move amount by which the registration rolls 6 move the paper sheet P is large, the paper sheet P becomes warped; thereby causing transfer errors such as skewing of images. Accordingly, the move amount is desirably as small as possible.

B. Operation

B-1. Operation of Reference Position Calculation

Operation of reference position calculation will now be described below. As has been described above, the storage unit 13 stores a reference position for each of the trays 2. A processing for calculating and writing a reference position into the storage unit 13 for each of the trays 2 is carried out by the control unit 12 before shipping the image forming device 1.

Figure 5:
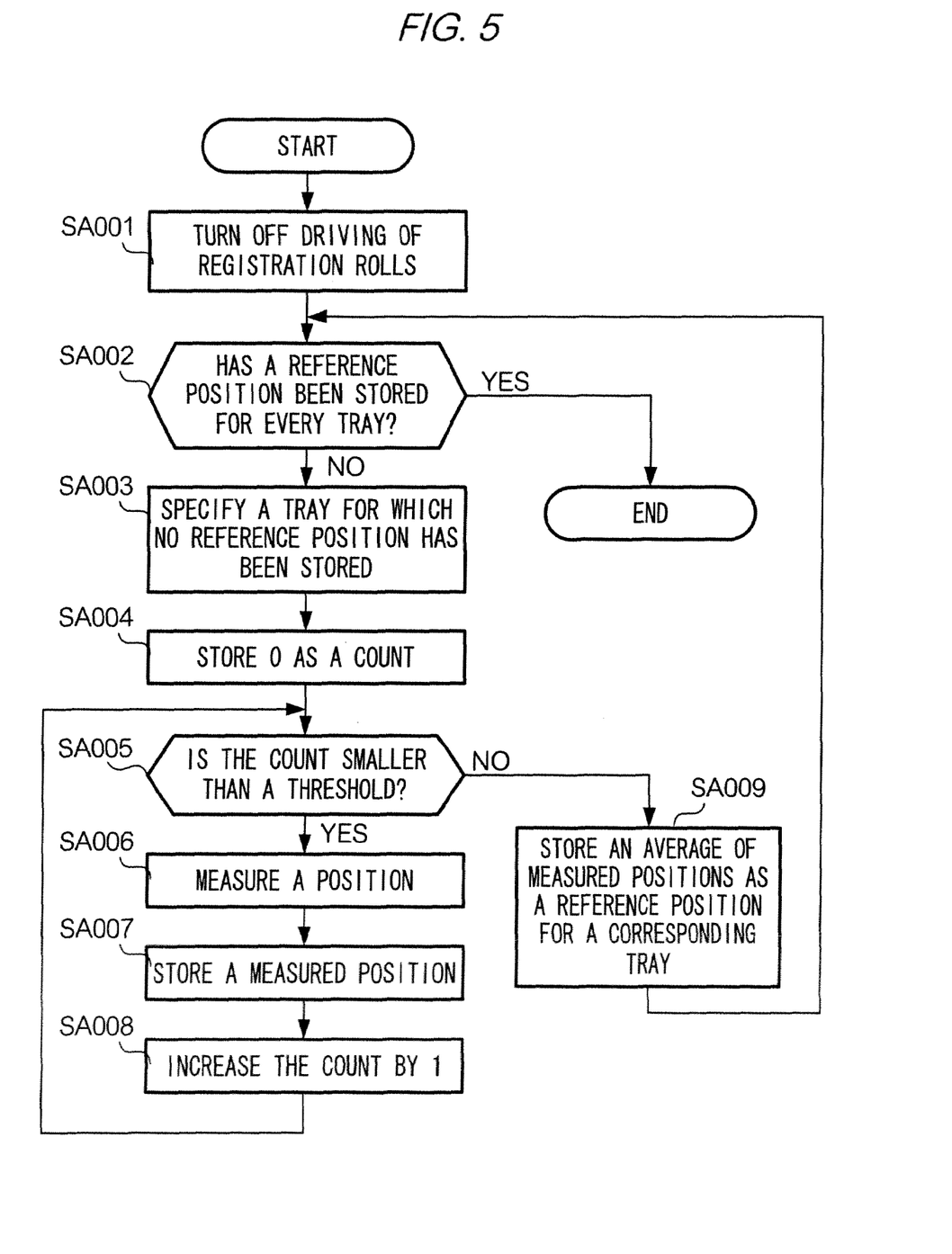
FIG. 5 is a flowchart for explaining a flow of an operation of a reference position calculation.

FIG. 5 is a flowchart which shows a flow of the operation of the reference position calculation.

At first, the control unit 12 turns off the driving of the registration rolls 6 for moving a paper sheet P in a direction which is parallel to the surface of the paper sheet P and perpendicular to the transporting direction, thereby to inhibit upward movement of the paper sheet P by the registration rolls 6 (step SA001). Next, the control unit 12 determines whether a reference position has been stored for each one of the trays or not, by referring to the storage unit 13 (step SA002). If a reference position has been stored for each one of the trays (step SA002: YES), the control unit 12 terminates the operation of the reference position calculation.

Conversely, if a reference position has not been stored for each one of the trays (step SA002: NO), the control unit 12 specifies which tray 2 has not stored a reference position (step SA003), and stores "0" as a measurement count conducted for the reference position calculation (step SA004). Next, the control unit 12 compares the count with a threshold prestored in the storage unit in order to determine whether or not the count is smaller than the threshold (step SA005). If the count is determined to be smaller than the threshold (step SA005 YES), the control unit 12 controls the transport unit 3 to pick up and convey a paper sheet P, and also controls the CIS sensor 7 to measure a position of a direction which is perpendicular to the transporting direction of the paper sheet P (step SA006). Further, the control unit 12 stores the obtained measured position into the storage unit 13 (step SA007), and increases the count by one (step SA008). In this manner, the steps SA005 to SA008 are repeated, and the count finally becomes equal to or greater than the threshold (step SA005: now). Then, the control unit 12 calculates an average value as an arithmetic mean of measured positions stored in the storage unit 13, and stores the average value as a reference position for the tray 2 (step SA009). Thereafter, the control unit 12 returns to the processing of the step SA002, and makes a determination as described above. For example, if the threshold is 3 and if the count is determined to be 0, 1, or 2 in the step SA005, the control unit 12 carries out a measurement (step SA006). When the count reaches 3, the control unit 12 calculates an average value of the measured positions. In other words, position measurement is carried out a number of times which is indicated as the threshold, for the tray 2.

For example, when calculating a reference position for the tray 2a, paper sheets P are transported three times, with the registration rolls 6 inhibited from moving the paper sheets P. For the three times, "5.2 mm", "5.8 mm", and "5.5 mm" are stored as respective measured positions. Therefore, "5.5 mm" calculated as an average value is written as a reference position for the tray 2a into the storage unit 13, as shown in FIG. 3A. These measured positions are each, a distance which is measured from an origin point O in the rightward direction in the figure, as a direction which intersects the paper sheet transporting direction. The positions are each, measured as a boundary position between a photo detector 7a which has received reflected light and another photo detector 7a which has not received reflected light.

The reference position is an average of positions which were measured by the CIS sensor 7 when the transport unit 3 actually picked up and transported paper sheets P from a particular tray 2. Therefore, there is a high possibility that the position to which a paper sheet P picked up from the particular tray 2 is transported by the transport unit 3 is close to the reference position. A method for calculating a reference position is not limited to the method of simply averaging positions which are measured plural times, as in this embodiment, but may be a method of averaging remaining measured values after excluding maximum and minimum measured values, or a method of averaging remaining measured values after excluding measured values which deviate to an unacceptable degree from the other measured values.

B-2. Operation of Preparatory Image Forming Processing

Figure 6:
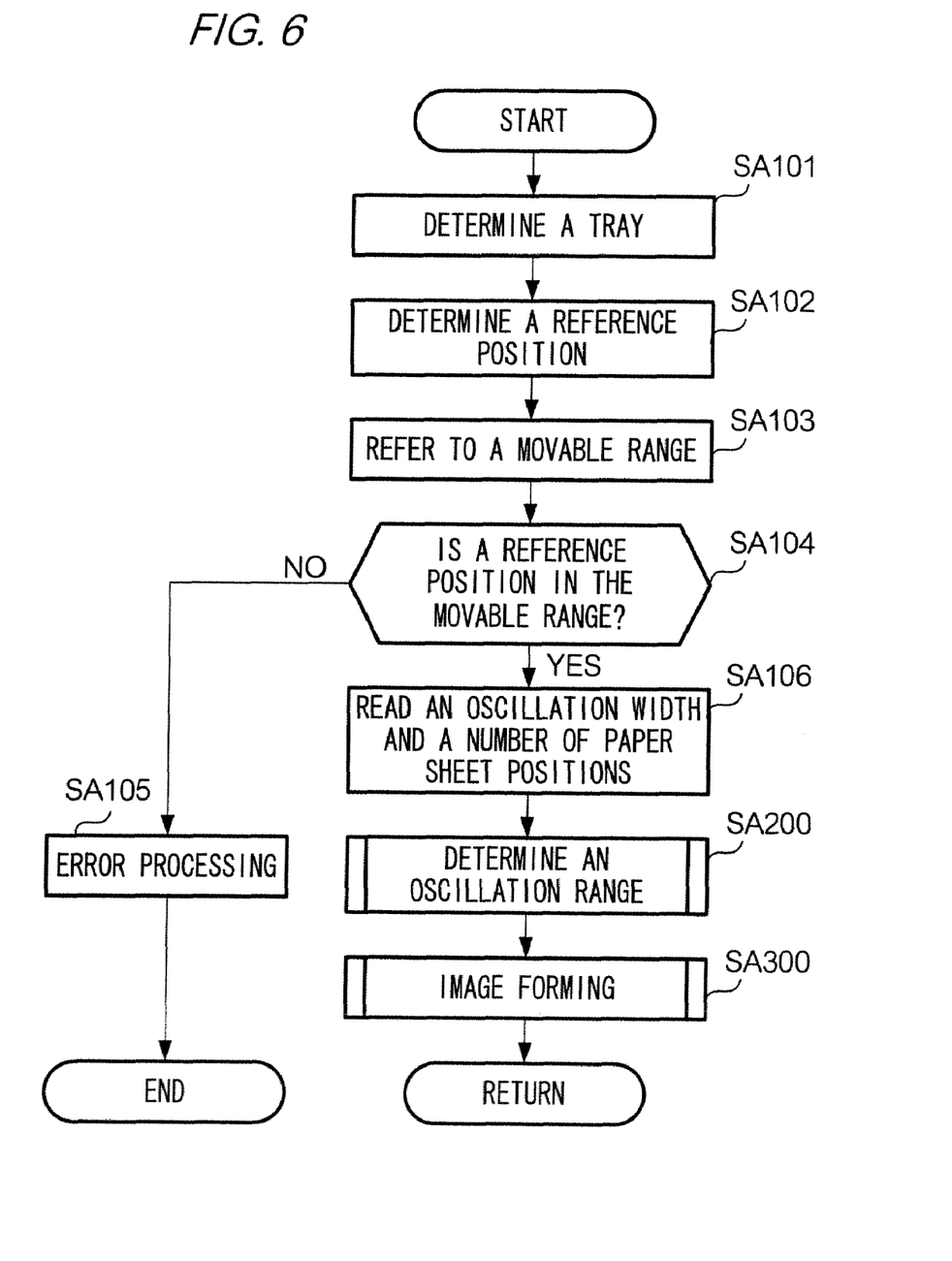
FIG. 6 is a flowchart for explaining a flow of an operation of a preparatory image forming processing.

Next, operation of a preparatory image forming processing will now be described below. FIG. 6 is a flow diagram which illustrates a flow of an operation of the preparatory image forming processing. When an instruction is given by a user, the control unit 12 firstly determines a tray 2 from which a paper sheet P is to be picked up (step SA101). The control unit 12 further reads and specifies a reference position for the tray 2 from the reference position table 131 in the storage unit 13 (step SA102). Next, the control unit 12 refers to a movable range from the parameter group 132 in the storage unit 13 (step SA103), and determines whether the reference position is within the movable range or not (step SA104). If the reference position is not determined to be within the movable range (step SA104: NO), the control unit 12 performs a predetermined error processing and then terminates the processing flow (step SA105). A reference position which is not within the movable range implies, for example, a case that the reference position is 1.5 mm in relation to a movable range of 2 to 10 mm. In this case, the aforementioned predetermined error processing is, for example, to display a warning phrase on a display unit not shown. Meanwhile, if the reference position is determined to be within the movable range (step SA104: YES), the control unit 12 reads an oscillation width and a number of paper sheet positions from the parameter group 132 in the storage unit 13 (step SA 106), and performs a processing for determining an oscillation range (step SA200). The control unit 12 then carries out an image forming processing (step SA300).

B-3. Operation of Oscillation Range Determination

Figure 7:
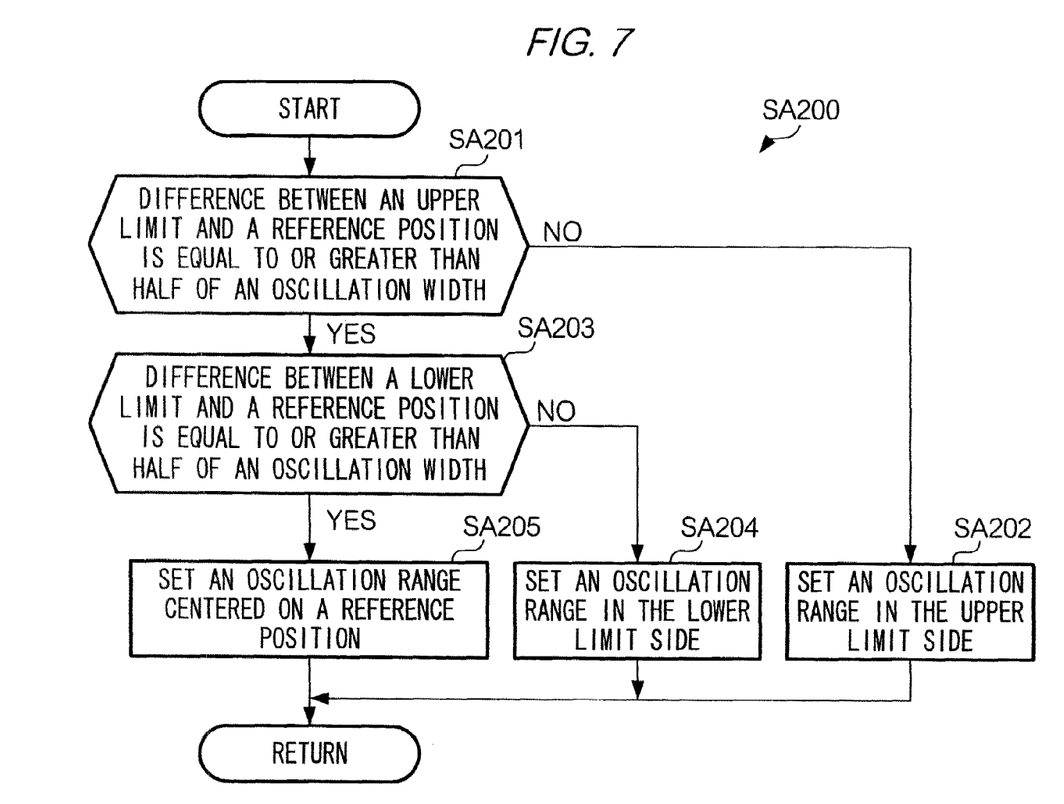
FIG. 7 is a flowchart for explaining a flow of an operation of an oscillation range determination.

Next, an operation of oscillation range determination will be described below. FIG. 7 is a flowchart which illustrates a flow of the operation of the oscillation range determination. At first, the control unit 12 determines whether or not a difference between an upper limit of a movable range and a reference position is equal to or greater than half of an oscillation width (step SA201). If this difference is determined to be smaller than half of the oscillation width (step SA201: NO), there is no sufficient distance to the reference position from the upper limit. Therefore, the control unit 12 determines that the range of the oscillation width centered on the reference position exceeds the movable range. Accordingly, the control unit 12 sets an oscillation range in the side of the upper limit (step SA201). Conversely, if the difference is determined to be equal to or greater than half of the oscillation width (step SA201: YES), there is sufficient distance to the reference position from the upper limit. Therefore, the control unit 12 then determines whether or not a lower limit of the movable range and the reference position is equal to or greater than half of the oscillation width (step SA203). If this difference is determined to be equal to or smaller than half of the oscillation width (step SA203: NO), there is no sufficient distance to the reference position from the lower limit. Therefore, the control unit 12 determines that the range of the oscillation width centered on the reference position exceeds the movable range. Accordingly, the control unit 12 sets an oscillation range in the side of the lower limit (step SA204).

Otherwise, if the difference is determined to be equal to or greater than half of the oscillation width (step SA203: YES), there is sufficient distance to the reference position from both the upper and lower limits. Therefore, the control unit 12 determines that the range of the oscillation width centered on the reference position does not exceed the movable range. Accordingly, the control unit 12 sets an oscillation range centered on the reference position (step SA205).

Figure 8:
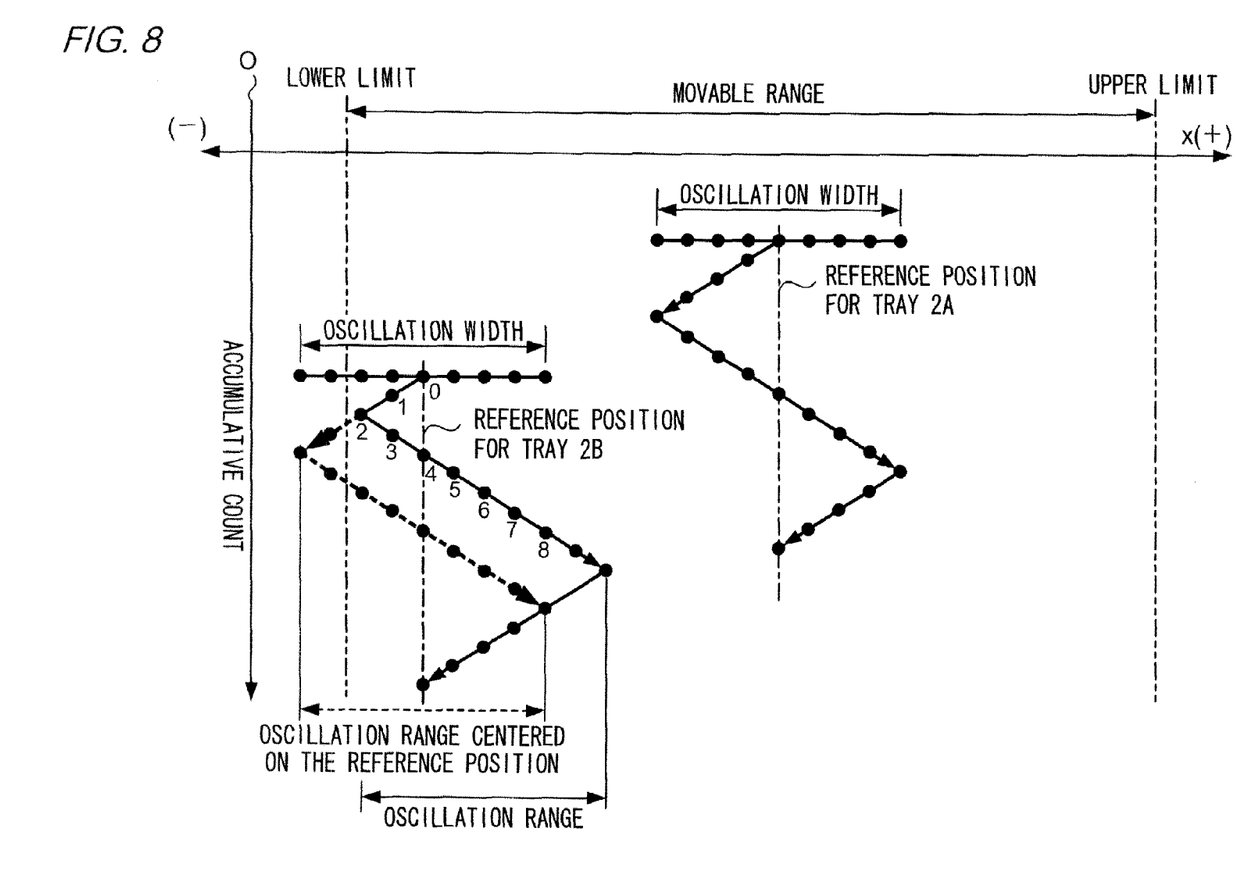
FIG. 8 is a conceptual diagram explaining an oscillation range.

Setting of an oscillation range through steps SA202, SA204, and SA205 will be described in detail below. FIG. 8 is a conceptual view which illustrates setting of an oscillation range. The origin point O shown in the figure is the same as that in FIG. 4B. As shown in this figure, a coordinate axis x extends rightward from the origin point O representing moving positions of the registration rolls 6. On the coordinate axis x, an upper limit (10.0 mm in this case) and a lower limit (2.0 mm in this case) to a movable range stored in the parameter group 132 are defined. After a reference position is determined for a tray 2, an oscillation range centered on the reference position is compared with the aforementioned movable range. In case of the tray 2a, the reference position is "5.5 mm" as shown in FIG. 3A, and accordingly, the "upper limit of the reference position" is "10.0−5.5=4.5" which is equal to or more than half of the oscillation width (4.0 mm/2=2.0 mm). Therefore, for the tray 2a, the reference position is determined to be sufficiently different from the upper limit of the movable range. Similarly, the "lower limit of a reference position" is "3.5" which is equal to or greater than half of the oscillation width. Therefore, for the tray 2a, a bilaterally symmetrical oscillation range centered on the reference position is set. The control unit 12 calculates a group of paper sheet positions of "nine points" which are arranged discretely at equal intervals throughout the oscillation range.

Otherwise, in case of a tray 2b, the reference position is "3.39 mm", and hence, a "lower limit of a reference position is "3.39−2.0=1.39" which is smaller than half of the oscillation width (4.0 mm/2=2.0 mm). Therefore, the reference position is not determined to be sufficiently distant from the lower limit, and accordingly, an oscillation range is set at the lower limit. Specifically, the control unit 12 firstly calculates a group of paper sheet positions of "nine points" which are arranged discretely at equal intervals throughout the oscillation width of "4.0 mm" centered on the reference position of the tray 2b. The group of positions are "1.39 mm, 1.89 mm, 2.39 mm, 2.89 mm, 3.39 mm, 3.89 mm, 4.39 mm, 4.89 mm, and 5.39 mm" from the left in the figure. Next, the control unit 12 compares the group of positions with the movable range. Since two left positions "1.39 mm and 1.89 mm" exceed the lower limit of the movable range, the control unit 12 moves these two positions in the plus direction along the coordinate axis x. That is, the control unit 12 sets, as an oscillation range, a range of "4.0 mm" toward the upper limit (in a direction opposite to the lower limit) from the position "2.39" which exceeds the lower limit and is closest to the lower limit, among the group of nine positions described above. Therefore, an oscillation range, which is indicated by a broken line in the figure and is centered on the reference position of the tray 2b, is not set but another oscillation range which is indicated by a solid line is set. A group of positions of the "nine points" which are discretely arranged at equal intervals throughout the latter oscillation range are calculated as a group of paper sheet positions. A description has been made above by referring to a case that the lower limit is exceeded by several positions among the group of positions identical to a number of the paper sheet positions which are discretely arranged at equal intervals throughout the oscillation range. In another case that the upper limit is exceeded by several positions, the same procedure as described above is taken except that the correcting direction is reversed. A description of such a procedure will be omitted herefrom.

If an oscillation range is set through the any of the steps SA202, SA204, or SA205 in a manner described above, the control unit 12 then returns from the processing SA200.

B-4. Image Forming Operation

Figure 9:
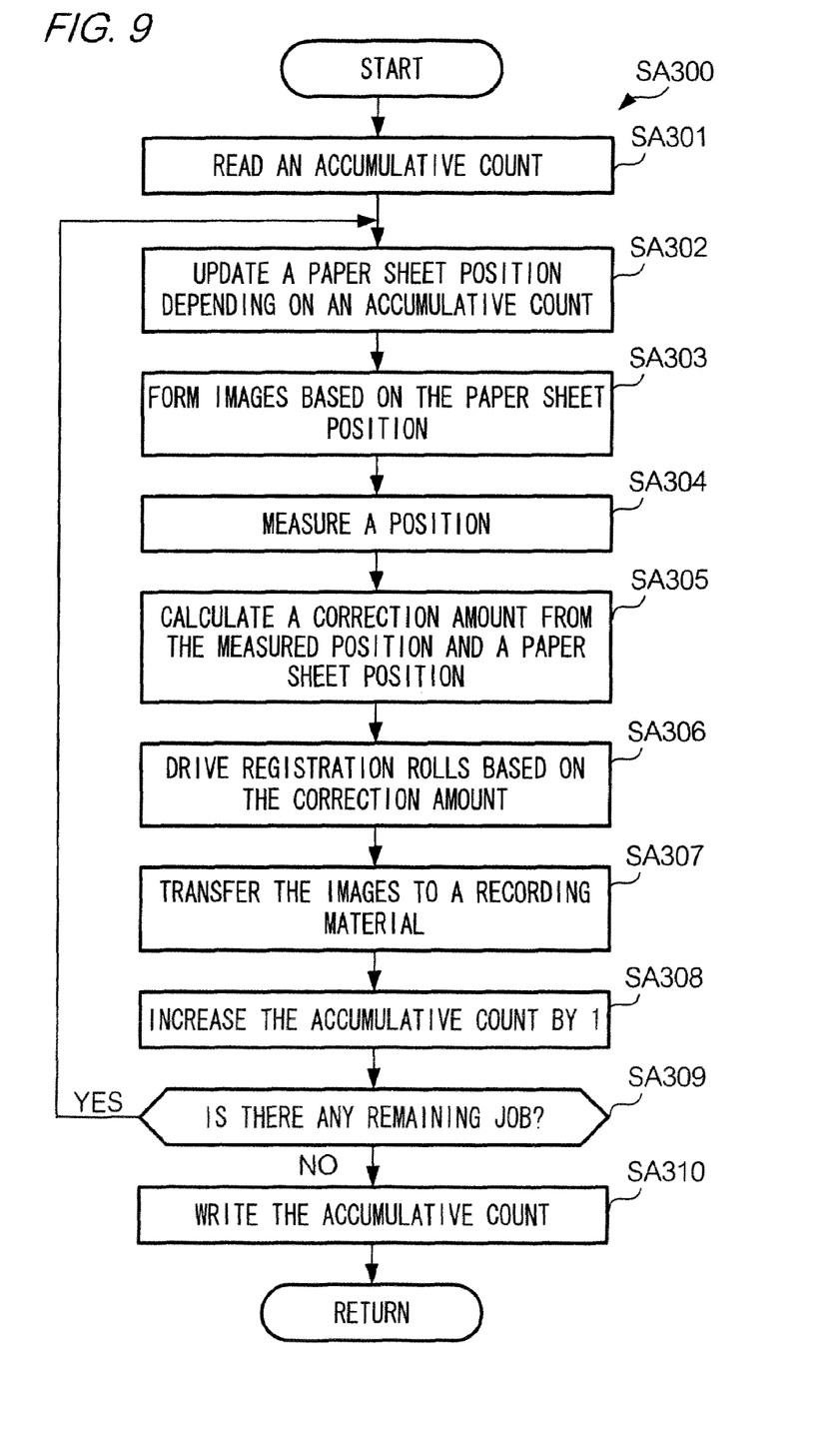
FIG. 9 is a flowchart for explaining a flow of an image forming operation.

Next, an image forming operation will be described below. FIG. 9 is a flowchart which shows a flow of an image forming operation. At first, the control unit 12 reads an "accumulative count" for each of the trays 2, from the reference position table 131 in the storage unit 13 (step SA301). The accumulative count is a parameter which is obtained by accumulatively counting the number of times that paper sheets P have been transported. The control unit 12 updates paper sheet positions, depending on the accumulative count (steps SA302). More specifically, the control unit 12 assigns numbers, such as 0, 1, 2, . . . , to calculated paper sheet positions in accordance with order of movement. The control unit 12 divides the accumulative count by a count threshold stored in the parameter group 132 in the storage unit 13, to obtain a quotient. The control unit 12 selects a paper sheet position assigned with a number corresponding to the quotient. For example, in case of the tray 2a in FIG. 3A, the accumulative count is 50, and the count threshold is 100. Accordingly, 0 is obtained as a quotient. Therefore, a reference position "5.5 mm" is selected as a paper sheet position. This reference position stays unchanged unless the quotient changes from 0 to 1. That is, the reference position is maintained as a paper sheet position until the accumulative count reaches 100. In case of the tray 2b, the accumulative count is 150, and accordingly, 1 is obtained as a quotient. Accordingly, the paper sheet position is "2.89" which is shifted by one step toward the side of the lower limit from the reference position "3.39" for the tray 2b. In this configuration, if recording materials are moved to a paper sheet position a number of times indicated by a count threshold, the paper sheet position is then updated. Recording materials are thereafter moved to a next paper sheet position.

Next, the control unit 12 causes the image forming units 4 to form toner images at positions on photosensitive members, which correspond to the paper sheet position (step SA303). The control unit 12 also causes the transport unit 3 to pick up a paper sheet P from a tray 2 determined in the step SA101, and causes the CIS sensor 7 to measure a position in the direction perpendicular to the transporting direction of the transported paper sheet P (step SA304). Further, the control unit 12 calculates a correction amount from a difference between the measured position and the paper sheet position (step SA305). Based on the correction amount, the control unit 12 drives the registration rolls 6 so as to move the transport unit 3 (step SA306). For example, if the paper sheet position is "5.5 mm" and the measured position is "4.5 mm", the correction amount is "+1.0 mm". Accordingly, the registration rolls 6 hold the paper sheet P, and move the paper sheet P by "1.0 mm" in the plus direction along the coordinate axis x from the origin point O shown in FIG. 8; and the left end of the paper sheet P moves closer to the paper sheet position.

Thereafter, the intermediate belt 9 copies, onto the surface of the intermediate belt 9, toner images which have been formed and carried on the photosensitive members of the image forming units 4, with the toner images layered on one another. The intermediate belt 9 further transfers the toner images to a paper sheet P which is transported to the recording position (step SA307). Further, the control unit 12 increases the "accumulative count" by 1 (step SA308), and determines whether or not there is a job remaining (step SA309). If it is determined that there is a job remaining (step SA309: YES), the control unit 12 returns the processing flow to the step SA302. Conversely, if it is determined that there is no job remaining (step SA309: NO), the control unit 12 writes the "accumulative count" into the reference position table 131 (step SA310), and recalls and returns from the processing SA300.

The recording materials to be picked up from the trays 2 cause positional shifts, in a particular direction perpendicular to the transporting direction when recording materials are transported and reach the recording position, due to mechanical precision of connecting portions between the trays 2 and the transport unit 3. However, such position shifts are substantially constant values for each of the trays 2. In the image forming device 1 described above, position measurement is carried out plural times for each of the trays 2. An average of measured positions is set as a reference position for each of the trays 2. Oscillation is performed within a range including the reference position. Therefore, an average of position shifts lowers although variants between position shifts of transported recording materials may increase in some cases. Further, if a bilaterally symmetrical oscillation range is centered on the reference position described above, the oscillation range may exceed a movable range in which recording materials can be moved by the registration rolls 6. Even in this case, the image forming device 1 described above sets an oscillation range so that the oscillation range may not exceed the movable range while maintaining a constant oscillation width. Therefore, sufficient oscillation is attained so that damages on the fixing device and the transfer device are reduced.

C. Modifications

The embodiment described above may be modified as follows. Modifications described below and the above embodiment can be arbitrarily combined with each other.

Though the above embodiment does not particularly describe any start condition concerning start of the processing for reference position calculation, various start conditions may be set. For example, the processing for reference position calculation described above may be carried out when an instruction to execute the processing of reference position calculation is given by a user through a manipulation unit not shown. Further, a reference position needs to be calculated when any of the trays 2 is replaced or newly added. Therefore, a detection unit for detecting attachment of trays 2 may be provided so that the processing for reference position calculation is carried out automatically each time the detection unit detects attachment of a tray 2. In this case, for example, the image forming device 1 is provided with a button-type switch which is energized by an elastic member, as an example of such a detection unit. In the switch, an internal contact point is set off by an energizing force of the elastic member when no tray 2 is attached. In this state, no predetermined signal is supplied to the control unit 12. When a tray 2 is attached, the internal contact point is set so that a predetermined signal is supplied to the control unit 12. Further, the control unit 12 may perform the processing for reference position calculation described previously, each time a signal is received through the switch.

In the above embodiment, attention is paid to a point where positions of paper sheets P differ between trays 2 which are storage units for containing paper sheets P. Hence, a reference position for paper sheets P is stored for each of the trays 2. The position of each paper sheet P is corrected depending on a difference between the reference position and a measured position. Thus, positions of paper sheets P differ between the trays 2 for at least one of the following reasons. One reason is that positions of paper sheets vary even when paper sheets are contained in trays 2 because of attachment errors of trays 2. Another reason is that the position of each paper sheet varies at the time that the paper sheet is transported from trays 2 to the recording position.

A "convey path" for a paper sheet is considered to be an area where a paper sheet passes from a tray 2, including the tray 2 as a storage unit which contains paper sheets. Both of the reasons described above imply that positions of paper sheets P differ between convey paths of the paper sheets. Where the embodiment is studied from this viewpoint, the embodiment can also be specified as follows.

That is, according to this embodiment, a recording material moving device includes: a transport unit that transports a recording material in a direction which is parallel to a recording surface of the recording material and perpendicular to a transporting direction, in an upstream side of a recording position along the convey direction of the recording material, the recording position being where an image is formed on the recording material; a reference position specifying unit that specifies a reference position which is taken as a reference when the transport unit moves the recording material; a determination unit that determines whether or not a range of a predetermined width centered on the reference position specified by the reference position specifying unit exceeds a movable range of the recording material within which the recording material can be moved by the position adjuster unit; a move controller that causes, if the determination unit determines that the movable range is not exceeded, the transport unit to sequentially move the recording material within the movable range of the predetermined width centered on the reference position each time that a condition for moving the recording material is satisfied, or causes, if the determination unit determines that the movable range is exceeded, the transport unit to sequentially move the recording material within the range of the predetermined width, which is included in the movable range and includes the reference position, each time that the condition for moving the recording material is satisfied, through a plurality of convey paths and transports the recording material through one of the plurality of convey paths to the recording position where the image is recorded on the recording material, wherein the reference position specifying unit includes a storage unit that stores the reference position determined for each of the plurality of transport units, with the reference position associated with one of the plurality of convey paths, and a specifying unit that specifies the reference position stored in the storage unit and associated with one of the plurality of convey paths through which the recording material is transported by the transport unit. An example of the transport unit in the recording material moving device is the transport unit 3 in the embodiment described above. An example of the storage unit is the storage unit 13 in the embodiment. An example of the measurement unit is the CIS sensor 7 in the embodiment. An example of the transport unit is the registration rolls 6 in the embodiment.

In particular, a convey path for "front surface printing" in "double-sided printing" may be distinguished from a convey path for "back surface printing". In a case of double-sided printing, a recording material is once transported by a reverse mechanism and then transported again to a recording position. Convey paths, as well as convey distances, differ between when an image is recorded on a front surface of a recording material and when an image is recorded on a back surface of the recording material. In many cases, such differences between convey paths as well as between convey distances cause recording positions to vary at the time of recording. In this case, for example, the storage unit 13 stores two reference positions for each of the trays 2. Specifically, the storage unit 13 stores first and second reference positions. The first reference position is an average value of positions which are measured when the transport unit 3 transports paper sheets P with one surface of each of the paper sheets P taken as a recording surface. The second reference position is an average of positions which are measured when the transport unit 3 transports the paper sheets P with the other surface of each of the paper sheets P taken as a recording surface. Further, when the transport unit 3 transports a paper sheet P with one surface of the paper sheet P taken as a recording surface, the control unit 12 reads the first reference position from the storage unit 13, and sets the first reference position as a reference position. When the transport unit 3 further transports the paper sheet P with the other surface of the paper sheet P taken as a recording surface after reversing the paper sheet P, for example, by a switch back mechanism, the control unit 12 reads the second reference position from the storage unit 13 and sets the second reference position as a reference position. Position correction may then be carried out.

In the above embodiment, the registration rolls 6 are positioned in the upstream side of the CIS sensor 7 along the paper sheet transporting direction. However, the CIS sensor 7 may be positioned in the upstream side of the registration rolls 6 along the paper sheet transporting direction, as indicated by a broken line in FIG. 4A.

In the above embodiment, the registration rolls 6 move a paper sheet P, taking as a correction amount a difference between a paper sheet position and a position measured by the CIS sensor 7, so that the position of the left end of the paper sheet P comes close to the paper sheet position. However, such a difference need not always be taken as a correction amount by which a paper sheet P should be moved. In brief, the registration rolls 6 need only to perform a correction processing using a correction amount corresponding to the difference. For example, the registration rolls 6 may carry out a correction processing, taking as a correction amount a value obtained by multiplying the difference by a predetermined magnification ratio (such as 0.8).

In the above embodiment, the control unit 12 assigns numbers, such as 0, 1, 2, . . . , to calculated paper sheet positions in accordance with the movements. The control unit 12 divides the accumulative count by a count threshold to obtain a quotient. The control unit 12 selects a paper sheet position assigned with a number corresponding to the quotient. However, a paper sheet position may be selected by a different method. For example, in the above embodiment, paper sheet positions are sequentially selected so as to reciprocate over an oscillation width. For every 16 movements, the paper sheet position returns to an original position. Therefore, numbers of 0 to 15 may be assigned to the respective 16 movements forming one cycle. A number corresponding to a margin obtained by dividing the aforementioned quotient by 16 may then be selected as a paper sheet position.

Figure 10A:
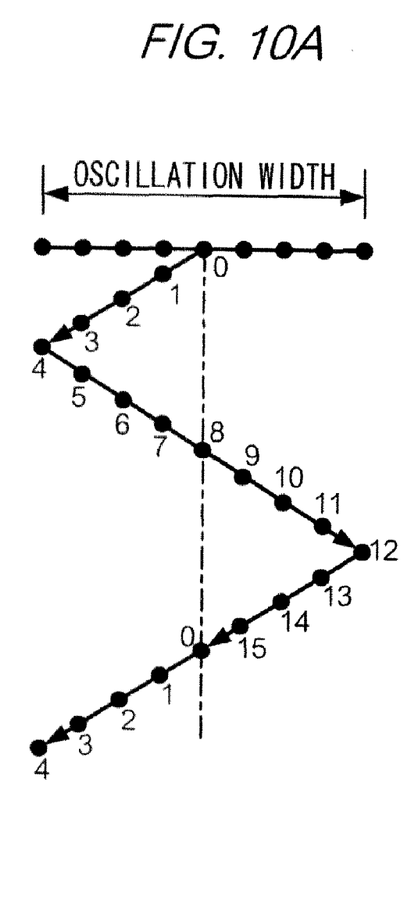
FIGS. 10A, 10B, and 10C are conceptual diagrams for explaining a method of selecting paper sheet positions which are discretely arranged within an oscillation range.
Figure 10B:
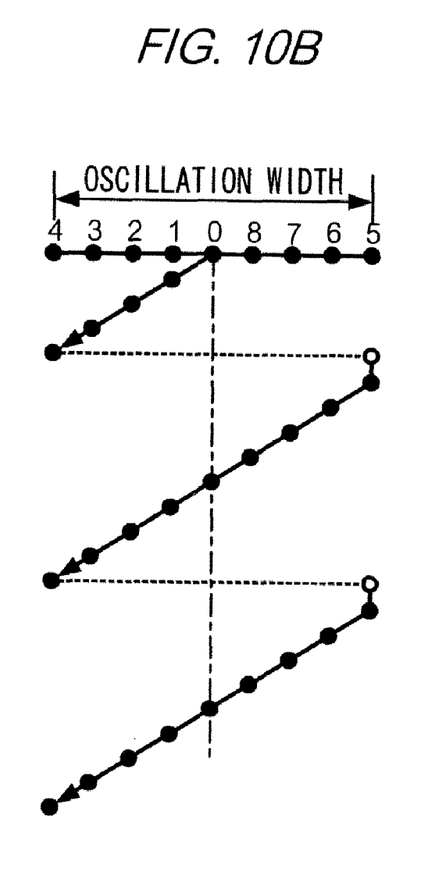
Figure 10C:
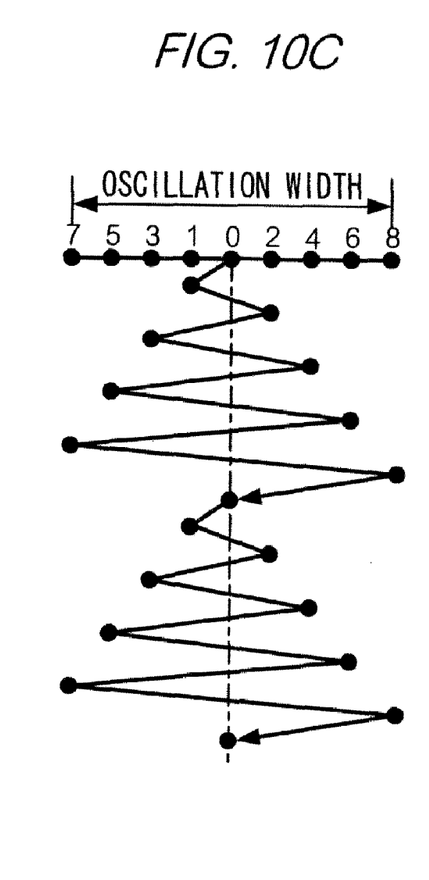

Otherwise, individual numbers may be assigned to all respective paper sheet positions. For example, as shown in FIG. 10B, 0 to 8 are assigned to respective paper sheet positions. A number corresponding to a margin obtained by dividing the aforementioned quotient by "9" as a number of paper sheet positions is selected as a paper sheet position. Then, paper sheet positions are sequentially selected in an order as plotted by a saw-tooth line in FIG. 10B. Otherwise, if numbers 0 to 8 are alternately assigned to the left and right sides in a sequence, starting from the center, paper sheet positions are alternately selected from the left and right sides in a sequence, as shown in FIG. 10C.

Also in the above embodiment, a group of paper sheet positions which consists of positions of a number of paper sheet positions is discretely arranged at equal intervals throughout an oscillation width. However, insofar as paper sheet positions are within an oscillation width, the paper sheet positions need not always be discretely arranged at equal intervals. For example, a group of paper sheet positions may be calculated so that a ratio between adjacent intervals is constant. Further, if only paper sheet positions are within an oscillation range, the number of paper sheet positions need not be determined. For example, the control unit 12 may generate a pseudo-random number when updating paper sheet positions, and may set, as a next paper sheet position, a position corresponding to the pseudo-random number within an oscillation range.

In the above embodiment, the control unit 12 calculates a group of positions of a number of paper sheet positions which are discretely arranged at equal intervals throughout an oscillation width centered on a reference position. If a range of the oscillation width centered on the reference position is determined as exceeding a movable range, a predetermined number of positions arranged discretely at equal intervals throughout an oscillation width from a position, which does not exceed the movable range and is closest to a limit of the movable range, to an opposite limit of the movable range to the foregoing limit are calculated as a group of paper sheet positions among the aforementioned group of positions. Each time a condition for moving a paper sheet P is satisfied, the paper sheet P is moved to a next position included in the group of paper sheet positions which have been calculated by the registration rolls 6. However, a method of calculating a group of paper sheet positions is not limited to this method. For example, if a range of an oscillation width centered on a reference position is determined as exceeding a movable range, the control unit 12 sets as an oscillation range a range of the oscillation width to an opposite limit of the movable range in the side in which the range exceeds the movable range. Further, the control unit 12 calculates a group of paper sheet positions consisting of positions of "nine points" of paper sheet positions which are discretely arranged at equal intervals throughout the oscillation range. Each time the condition for moving a paper sheet P is satisfied, a paper sheet P is moved to a next position included in the group of paper sheet positions.

In the above embodiment, the control unit 12 accumulatively counts an "accumulative count" for each of the trays 2 indicating the number of times that the paper sheets have been transported. However, a different type of value may be accumulatively counted. For example, the control unit 12 may accumulatively add up numerical values, each of which corresponds to a length of a paper sheet, as an "accumulative count" for each of the trays 2. More specifically, when an A4 size paper sheet is transported one time from a tray 2, the control unit 12 adds "1" to the "accumulative count" for the tray 2. Alternatively, when an A3 size paper sheet which is twice as long in the transporting direction as the A4 size transported one time from a tray 2, the control unit 12 adds "2" to the "accumulative count" for the tray 2. Conversely, an "accumulative distance" may be used as a parameter, in place of the "accumulative count". The accumulative distance is a total length by which recording materials have been transported in the transporting direction from a tray 2. More specifically, the "accumulative distance" may be obtained by accumulatively adding "210 mm" repeatedly each time that an A4 size paper sheet is transported from the tray 2 or by accumulatively adding "420 mm" repeatedly each time that an A3 size paper sheet is transported from the tray 2.

In the above embodiment, the parameter group 132 stored in the storage unit 13 includes upper and lower limits of a movable range, an oscillation range, a number of paper sheet positions, and a count threshold. These parameters may be set by a user. In this case, a user gives an instruction for setting a parameter through a manipulation unit not shown. The control unit 12 then interprets the instruction and rewrites a corresponding parameter in the parameter group 132.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording material moving device, comprising:
a position adjuster that moves a recording material in a direction which is parallel to a recording surface of the recording material and orthogonal to a transporting direction, in an upstream side of a recording position along the conveying direction of the recording material, the recording position being where an image is formed on the recording material;
a reference position specifying unit that specifies a reference position which is taken as a reference when the transport unit moves the recording material;
a determination unit that determines whether a range of a predetermined width centered on the reference position specified by the reference position specifying unit exceeds a movable range of the recording material within which the recording material can be moved by the position adjuster; and
a controller that causes, if the determination unit determines that the range of the predetermined width does not exceed the movable range, the position adjuster to sequentially move the recording material within the movable range of the predetermined width centered on the reference position each time a condition for moving the recording material is satisfied, or causes, if the determination unit determines that the range of the predetermined width exceed the movable range, the position adjuster to sequentially move the recording material within the range of the predetermined width, which is included in the movable range and includes the reference position, each time the condition for moving the recording material is satisfied,
wherein;
the controller calculates a first position group as a move position group if the determination unit determines that the range of the predetermined width does not exceed the movable range, the first position group including a predetermined number of positions which are discretely arranged throughout the predetermined width centered on the reference position, or
the controller calculates a second position group as a move position group if the determination unit determines that the range of the predetermined width exceeds the movable range, the second position group including a predetermined number of positions which are discretely arranged throughout the predetermined width toward the opposite limit of the movable range from a position which does not exceed the movable range and is closest to the limit of the movable range, and
each time the condition for moving the recording material is satisfied, the controller causes the position adjuster to sequentially move the recording material to a next position in the positions included in the move position group.

2. A recording material moving device, comprising:
a position adjuster that moves a recording material in a direction which is parallel to a recording surface of the recording material and orthogonal to a transporting direction, in an upstream side of a recording position along the conveying direction of the recording material, the recording position being where an image is formed on the recording material;
a reference position specifying unit that specifies a reference position which is taken as a reference when the transport unit moves the recording material;
a determination unit that determines whether a range of a predetermined width centered on the reference position specified by the reference position specifying unit exceeds a movable range of the recording material within which the recording material can be moved by the position adjuster; and
a controller that causes, if the determination unit determines that the range of the predetermined width does not exceed the movable range, the position adjuster to sequentially move the recording material within the movable range of the predetermined width centered on the reference position each time a condition for moving the recording material is satisfied, or causes, if the determination unit determines that the range of the predetermined width exceed the movable range, the position adjuster to sequentially move the recording material within the range of the predetermined width, which is included in the movable range and includes the reference position, each time the condition for moving the recording material is satisfied;

a plurality of storage units each of which contains the recording material; and a transport unit that picks up the recording material out of one of the plurality of storage units, and transports the recording material to the recording position, wherein the reference position specifying unit includes:

a memory that stores the reference position determined for each of the plurality of storage units, with the reference position associated with a corresponding one of the plurality of storage units, and a specifying unit that specifies the reference position stored and associated with one of the plurality of storage units in which the recording material transported by the transport unit is contained.

3. The recording material moving device according to claim 2, further comprising a measurement unit that measures a position in the direction which is parallel to the recording surface of the recording material transported by the transport unit and is orthogonal to the transporting direction, wherein the reference position is calculated from positions measured by the measurement unit for a respective plurality of recording materials, with the plurality of recording materials inhibited from being moved by the position adjuster, the plurality of recording materials picked up and transported out of one of the plurality of storage units by the transport unit.

4. The recording material moving device according to claim 3, further comprising a detector that detects attachment of each of the plurality of storage units to an attachment position for a corresponding one of the plurality of storage units, wherein if the detector detects attachment of one of the plurality of storage units, the reference position is written and stored, as a reference position for the one of the plurality of storage units, into the memory, the reference position calculated from the positions measured by the measurement unit for the respective plurality of recording materials, with the plurality of recording materials inhibited from being moved by the transport unit, the plurality of recording materials picked up and transported out of one of the plurality of storage units by the transport unit.

5. The recording material moving device according to claim 2, wherein:

the memory stores, as the reference position associated with one of the plurality of storage units, a first reference position for when the transport unit transports the recording material with one surface of the recording material taken as the recording surface, and a second reference position for when the transport unit transports the recording material with the other surface of the recording material taken as the recording surface; and when the transport unit transports the recording material with the one surface of the recording material taken as the recording surface, the specifying unit specifies the first reference position as the reference position for one of the plurality of storage units in which the recording material has been contained, or when the transport unit transports the recording material with the other surface of the recording material taken as the recording surface, the specifying unit specifies the second reference position as the reference position for one of the plurality of storage units in which the recording material is contained.

6. The recording material moving device according to claim 3, wherein:

the memory stores, as the reference position associated with one of the plurality of storage units, a first reference position for when the transport unit transports the recording material with one surface of the recording material taken as the recording surface, and a second reference position for when the transport unit transports the recording material with the other surface of the recording material taken as the recording surface; and when the transport unit transports the recording material with the one surface of the recording material taken as the recording surface, the specifying unit specifies the first reference position as the reference position for one of the plurality of storage units in which the recording material has been contained, or when the transport unit transports the recording material with the other surface of the recording material taken as the recording surface, the specifying unit specifies the second reference position as the reference position for one of the plurality of storage units in which the recording material is contained.

7. The recording material moving device according to claim 4, wherein:

the memory stores, as the reference position associated with one of the plurality of storage units, a first reference position for when the transport unit transports the recording material with one surface of the recording material taken as the recording surface, and a second reference position for when the transport unit transports the recording material with the other surface of the recording material taken as the recording surface; and when the transport unit transports the recording material with the one surface of the recording material taken as the recording surface, the specifying unit specifies the first reference position as the reference position for one of the plurality of storage units in which the recording material has been contained, or when the transport unit transports the recording material with the other surface of the recording material taken as the recording surface, the specifying unit specifies the second reference position as the reference position for one of the plurality of storage units in which the recording material is contained.

8. A recording material moving device, comprising:

a position adjuster that moves a recording material in a direction which is parallel to a recording surface of the recording material and orthogonal to a transporting direction, in an upstream side of a recording position along the conveying direction of the recording material, the recording position being where an image is formed on the recording material;

a reference position specifying unit that specifies a reference position which is taken as a reference when the transport unit moves the recording material;

a determination unit that determines whether a range of a predetermined width centered on the reference position specified by the reference position specifying unit exceeds a movable range of the recording material within which the recording material can be moved by the position adjuster; and a controller that causes, if the determination unit determines that the range of the predetermined width does not exceed the movable range, the position adjuster to sequentially move the recording material within the movable range of the predetermined width centered on the reference position each time a condition for moving the recording material is satisfied, or causes, if the determination unit determines that the range of the predetermined width exceed the movable range, the position adjuster to sequentially move the recording material within the range of the predetermined width, which is included in the movable range and includes the reference position, each time the condition for moving the recording material is satisfied; and a transport unit that transports the recording material through one of a plurality of transport paths to the recording position where the image is recorded on the recording material, wherein the reference position specifying unit includes:
   a memory that stores the reference position determined for each of the plurality of storage units, with the reference position associated with one of the plurality of transport paths, and
   a specifying unit that specifies the reference position stored in the memory and associated with one of the plurality of transport paths through which the recording material is transported by the transport unit.

9. An image forming device comprising:
a position adjuster that moves a recording material in a direction which is parallel to a recording surface of the recording material and orthogonal to a transporting direction, in an upstream side of a recording position along the transport direction of the recording material, the recording position being where an image is formed on the recording material;

a reference position specifying unit that specifies a reference position which is taken as a reference when the position adjuster moves the recording material;

a determination unit that determines whether a range of a predetermined width centered on the reference position specified by the reference position specifying unit exceeds a movable range of the recording material within which the recording material can be moved by the position adjuster;

a controller that causes, if the determination unit determines that the range of the predetermined width does not exceed the movable range, the position adjuster to sequentially move the recording material within the movable range of the predetermined width centered on the reference position each time a condition for moving the recording material is satisfied, or causes, if the determination unit determines that the width of the predetermined range exceeds the movable range, the position adjuster to sequentially move the recording material within the range of the predetermined width, which is included in the movable range and includes the reference position, each time the condition for moving the recording material is satisfied;

a plurality of storage units each of which contains the recording material; and a transport unit that picks up the recording material out of one of the plurality of storage units, and transports the recording material to the recording position;

an image forming unit that forms an image on a position on an image carrier which carries the image, the position determined for the recording material caused to move by the controller; and a transfer unit that transfers and records the image, which is formed by the image forming unit and carried by the image carrier, onto the recording material caused to move by the controller, wherein the reference position specifying unit includes:
   a memory that stores the reference position determined for each of the plurality of storage units, with the reference position associated with a corresponding one of the plurality of storage units, and
   a specifying unit that specifies the reference position stored and associated with one of the plurality of storage units in which the recording material transported by the transport unit is contained.

10. An image forming device comprising:
a position adjuster that moves a recording material in a direction which is parallel to a recording surface of the recording material and orthogonal to a transporting direction, in an upstream side of a recording position along the transport direction of the recording material, the recording position being where an image is formed on the recording material;

a reference position specifying unit that specifies a reference position which is taken as a reference when the position adjuster moves the recording material;

a determination unit that determines whether a range of a predetermined width centered on the reference position specified by the reference position specifying unit exceeds a movable range of the recording material within which the recording material can be moved by the position adjuster; and a controller that causes, if the determination unit determines that the range of the predetermined width does not exceed the movable range, the position adjuster to sequentially move the recording material within the movable range of the predetermined width centered on the reference position each time a condition for moving the recording material is satisfied, or causes, if the determination unit determines that the range of the predetermined width exceed the movable range, the position adjuster to sequentially move the recording material within the range of the predetermined width, which is included in the movable range and includes the reference position, each time the condition for moving the recording material is satisfied;

a plurality of storage units each of which contains the recording material;

a transport unit that picks up the recording material out of one of the plurality of storage units, and transports the recording material to the recording position;

a measurement unit that measures a position in the direction which is parallel to the recording surface of the recording material transported by the transport unit and is orthogonal to the transporting direction;

an image forming unit that forms an image on a position on an image carrier which carries the image, the position determined for the recording material caused to move by the controller; and a transfer unit that transfers and records the image, which is formed by the image forming unit and carried by the image carrier, onto the recording material caused to move by the controller, wherein:

the reference position specifying unit includes:
   a memory that stores the reference position determined for each of the plurality of storage units, with the reference position associated with a corresponding one of the plurality of storage units, and
   a specifying unit that specifies the reference position stored and associated with one of the plurality of storage units in which the recording material transported by the transport unit is contained; and the reference position is calculated from positions measured by the measurement unit for a respective plurality of recording materials, with the plurality of recording materials inhibited from being moved by the position adjuster, the plurality of recording materials picked up and transported out of one of the plurality of storage units by the transport unit.

11. An image forming device comprising:

An image forming device comprising:

a position adjuster that moves a recording material in a direction which is parallel to a recording surface of the recording material and orthogonal to a transporting direction, in an upstream side of a recording position along the transport direction of the recording material, the recording position being where an image is formed on the recording material;

a reference position specifying unit that specifies a reference position which is taken as a reference when the position adjuster moves the recording material;

a determination unit that determines whether a range of a predetermined width centered on the reference position specified by the reference position specifying unit exceeds a movable range of the recording material within which the recording material can be moved by the position adjuster; and a controller that causes, if the determination unit determines that the range of the predetermined width does not exceed the movable range, the position adjuster to sequentially move the recording material within the movable range of the predetermined width centered on the reference position each time a condition for moving the recording material is satisfied, or causes, if the determination unit determines that the range of the predetermined width exceeds the movable range, the position adjuster to sequentially move the recording material within the range of the predetermined width, which is included in the movable range and includes the reference position, each time the condition for moving the recording material is satisfied;

a plurality of storage units each of which contains the recording material; and a transport unit that picks up the recording material out of one of the plurality of storage units, and transports the recording material to the recording position;

a measurement unit that measures a position in the direction which is parallel to the recording surface of the recording material transported by the transport unit and is orthogonal to the transporting direction;

a detector that detects attachment of each of the plurality of storage units to an attachment position for a corresponding one of the plurality of storage units;

an image forming unit that forms an image on a position on an image carrier which carries the image, the position determined for the recording material caused to move by the controller; and a transfer unit that transfers and records the image, which is formed by the image forming unit and carried by the image carrier, onto the recording material caused to move by the controller, wherein:

the reference position specifying unit includes:

a memory that stores the reference position determined for each of the plurality of storage units, with the reference position associated with a corresponding one of the plurality of storage units, and a specifying unit that specifies the reference position stored and associated with one of the plurality of storage units in which the recording material transported by the transport unit is contained;

the reference position is calculated from positions measured by the measurement unit for a respective plurality of recording materials, with the plurality of recording materials inhibited from being moved by the position adjuster, the plurality of recording materials picked up and transported out of one of the plurality of storage units by the transport unit; and if the detector detects attachment of one of the plurality of storage units, the reference position is written and stored, as a reference position for the one of the plurality of storage units, into the memory, the reference position calculated from the positions measured by the measurement unit for the respective plurality of recording materials, with the plurality of recording materials inhibited from being moved by the transport unit, the plurality of recording materials picked up and transported out of one of the plurality of storage units by the transport unit.

12. An image forming device comprising:

a position adjuster that moves a recording material in a direction which is parallel to a recording surface of the recording material and orthogonal to a transporting direction, in an upstream side of a recording position along the transport direction of the recording material, the recording position being where an image is formed on the recording material;

a reference position specifying unit that specifies a reference position which is taken as a reference when the position adjuster moves the recording material;

a determination unit that determines whether a range of a predetermined width centered on the reference position specified by the reference position specifying unit exceeds a movable range of the recording material within which the recording material can be moved by the position adjuster; and a controller that causes, if the determination unit determines that the range of the predetermined width does not exceed the movable range, the position adjuster to sequentially move the recording material within the movable range of the predetermined width centered on the reference position each time a condition for moving the recording material is satisfied, or causes, if the determination unit determines that the range of the predetermined width exceeds the movable range, the position adjuster to sequentially move the recording material within the range of the predetermined width, which is included in the movable range and includes the reference position, each time the condition for moving the recording material is satisfied;

a plurality of storage units each of which contains the recording material; and a transport unit that picks up the recording material out of one of the plurality of storage units, and transports the recording material to the recording position;

a detector that detects attachment of each of the plurality of storage units to an attachment position for a corresponding one of the plurality of storage units;

an image forming unit that forms an image on a position on an image carrier which carries the image, the position determined for the recording material caused to move by the controller; and a transfer unit that transfers and records the image, which is formed by the image forming unit and carried by the image carrier, onto the recording material caused to move by the controller, wherein:

the reference position specifying unit includes:
- a memory that stores the reference position determined for each of the plurality of storage units, with the reference position associated with a corresponding one of the plurality of storage units, and
- a specifying unit that specifies the reference position stored and associated with one of the plurality of storage units in which the recording material transported by the transport unit is contained;

if the detector detects attachment of one of the plurality of storage units, the reference position is written and stored, as a reference position for the one of the plurality of storage units, into the memory, the reference position calculated from the positions measured by the measurement unit for the respective plurality of recording materials, with the plurality of recording materials inhibited from being moved by the transport unit, the plurality of recording materials picked up and transported out of one of the plurality of storage units by the transport unit.

13. An image forming device comprising:
- a position adjuster that moves a recording material in a direction which is parallel to a recording surface of the recording material and orthogonal to a transporting direction, in an upstream side of a recording position along the transport direction of the recording material, the recording position being where an image is formed on the recording material;
- a reference position specifying unit that specifies a reference position which is taken as a reference when the position adjuster moves the recording material;
- a determination unit that determines whether a range of a predetermined width centered on the reference position specified by the reference position specifying unit exceeds a movable range of the recording material within which the recording material can be moved by the position adjuster; and
- a controller that causes, if the determination unit determines that the range of the predetermined width does not exceed the movable range, the position adjuster to sequentially move the recording material within the movable range of the predetermined width centered on the reference position each time a condition for moving the recording material is satisfied, or causes, if the determination unit determines that the range of the predetermined width exceeds the movable range, the position adjuster to sequentially move the recording material within the range of the predetermined width, which is included in the movable range and includes the reference position, each time the condition for moving the recording material is satisfied;
- a transport unit that transports the recording material through one of a plurality of transport paths to the recording position where the image is recorded on the recording material;
- an image forming unit that forms an image on a position on an image carrier which carries the image, the position determined for the recording material caused to move by the controller; and
- a transfer unit that transfers and records the image, which is formed by the image forming unit and carried by the image carrier, onto the recording material caused to move by the controller, wherein the reference position specifying unit includes:
- a memory that stores the reference position determined for each of the plurality of storage units, with the reference position associated with one of the plurality of transport paths, and
- a specifying unit that specifies the reference position stored in the memory and associated with one of the plurality of transport paths through which the recording material is transported by the transport unit.

* * * * *